(12) United States Patent
Szkudlarek et al.

(10) Patent No.: US 8,790,762 B2
(45) Date of Patent: *Jul. 29, 2014

(54) UNSATURATED POLYESTER RESIN

(75) Inventors: Marian Henryk Szkudlarek, Nordhorn (DE); Johan Franz Gradus Antonius Jansen, Geleen (NL); Silvana Rensina Antonnietta Di Silvestre, Barg aan de maas (NL); Stefanus Jacobus Duyvestijn, Deventer (NL)

(73) Assignee: DSM IP Assets B.V., Heerlen (NL)

( * ) Notice: Subject to any disclaimer, the term of this patent is extended or adjusted under 35 U.S.C. 154(b) by 56 days.

This patent is subject to a terminal disclaimer.

(21) Appl. No.: 13/255,609

(22) PCT Filed: Mar. 24, 2010

(86) PCT No.: PCT/EP2010/053848
§ 371 (c)(1),
(2), (4) Date: Feb. 6, 2012

(87) PCT Pub. No.: WO2010/108963
PCT Pub. Date: Sep. 30, 2010

(65) Prior Publication Data
US 2012/0121841 A1 May 17, 2012

(30) Foreign Application Priority Data

Mar. 25, 2009 (EP) .................................. 09156130
Mar. 25, 2009 (EP) .................................. 09156131
Mar. 25, 2009 (EP) .................................. 09156137
Mar. 25, 2009 (EP) .................................. 09156139
Mar. 25, 2009 (EP) .................................. 09156142

(51) Int. Cl.
*B32B 1/02* (2006.01)
*B32B 1/08* (2006.01)
*C08G 63/47* (2006.01)
*C08G 63/54* (2006.01)

(52) U.S. Cl.
USPC ............ 428/35.7; 428/36.9; 525/40; 528/304

(58) Field of Classification Search
USPC ................ 428/35.7, 36.9; 528/303, 304, 306; 524/604; 525/40, 49
See application file for complete search history.

(56) References Cited

U.S. PATENT DOCUMENTS

| 4,539,390 | A | * | 9/1985 | Jackson et al. ................ 528/303 |
| 5,420,205 | A | | 5/1995 | Becker et al. |
| 6,794,483 | B2 | * | 9/2004 | Loza et al. .................... 528/306 |
| 2006/0240352 | A1 | * | 10/2006 | Ogawa et al. ............. 430/109.3 |
| 2008/0039593 | A1 | * | 2/2008 | Glockner et al. ............. 525/450 |

FOREIGN PATENT DOCUMENTS

WO WO 97/27253 7/1997

OTHER PUBLICATIONS

International Search Report for PCT/EP2010/053848, mailed May 20, 2010.

* cited by examiner

*Primary Examiner* — Erik Kashnikow
(74) *Attorney, Agent, or Firm* — Nixon & Vanderhye P.C.

(57) ABSTRACT

The present invention relates to an unsaturated polyester resin comprising itaconate esters as reactive unsaturations, wherein the acid value of the resin is in the range of from 25 to 125 and the molar ratio of hydroxyl end groups and carboxylic acid end groups is in the range of from 0.33 to 3. In one embodiment, the molar ratio of hydroxyl end groups and carboxylic acid end groups is in the range of from 0.33 to 0.9. In another embodiment, the molar ratio of hydroxyl end groups and carboxylic acid end groups is in the range of from 1.1 to 3.

11 Claims, No Drawings

UNSATURATED POLYESTER RESIN

This application is the U.S. national phase of International Application No. PCT/EP2010/053848, filed 24 Mar. 2010, which designated the U.S. and claims priority to EP Application No. 09156139.9, filed 25 Mar. 2009; EP Application No. 09156131.6, filed 25 Mar. 2009; EP Application No. 09156130.8, filed 25 Mar. 2009; EP Application No. 09156142.3, filed 25 Mar. 2009; and EP Application No. 09156137.3, filed 25 Mar. 2009, the entire contents of each of which are hereby incorporated by reference.

The present invention relates to an unsaturated polyester resin, suitable to be used in the manufacturing of structural parts, comprising itaconate esters as reactive unsaturations in the resin.

Unsaturated polyester (UP) resin compositions that are suitable for construction purposes contain copolymerizable monomers as reactive diluent. Unsaturated polyester resin compositions currently applied for obtaining structural parts often contain considerable quantities of styrene as copolymerizable reactive diluent. As a result of the presence of styrene, styrene may escape during the preparation and curing, but also even during the envisaged long-term use thereof, and causes an undesirable odour, and possibly even also toxic effects. Thus there is a desire to reduce the styrene emission. Due to the fact that the unsaturated polyester resin is only copolymerizable, the amount of styrene can not be reduced further in the styrene containing resins, without detrimentally affecting the mechanical properties of the cured composites. Consequently there is a need for homopolymerizable unsaturated polyester resins.

WO-A-9727253 describes the synthesis of itaconic based powder coating resins which are homopolymerizable. In this publication, the standard UP synthesis procedure, in which all the raw materials for the resin are mixed and condensed at higher temperatures, is not applied. The homopolymerizable itaconic based unsaturated polyesters has been prepared by either using the prepolymer approach, in which a hydroxyl functional polymer or oligomer is modified in the second step with itaconic acid and condensed to low acid values combined with high hydroxyl values, or by using the anhydride approach, in which hydroxyl functional polymers are modified with itaconic anhydride resulting in high acid value resins combined with low hydroxyl values.

It has now been found that the resins described in WO-A-9727253 are not suitable for construction purposes as the cured resin is either too soft or too brittle. In case the cured resin is too soft, the cured part does not have sufficient mechanical integrity to resist external forces. In case the cured resin is too brittle, the cured part will break easily.

The object is to provide an unsaturated polyester resin comprising itaconate esters as reactive unsaturations that is suitable to be applied for construction purposes.

The inventors surprisingly found that this could be achieved with an unsaturated polyester resins comprising itaconate esters as reactive unsaturations, with an acid value in the range from 25 to 125 mg KOH/g resin and a molar ratio of hydroxyl end groups and carboxylic acid end groups in the range from 0.33 to 3.

An additional advantage is that the unsaturated polyester according to the invention could be synthesized using standard unsaturated polyester synthesis process in which all the raw materials for the resin are mixed and condensed at higher temperatures.

Without being bound by theory, it may be the case that the suitability of the resins according to the invention for construction purposes is due to the simultaneous presence of hydroxyl and acid groups.

The acid value of the unsaturated polyester resin according to the invention is preferably in the range from 30 to 100 mg KOH/g resin, more preferably from 35 to 75 mg KOH/g resin. As used herein, the acid value of the resin composition is determined titrimetrically according to ISO 2114-2000.

In one embodiment of the invention, the molar ratio of hydroxyl end groups and carboxylic acid end groups in the unsaturated polyester resin according to the invention is in the range from 0.33 to 0.9. In another preferred embodiment, the molar ratio of hydroxyl end groups and carboxylic acid end groups in the unsaturated polyester resin according to the invention is in the range from 1.1 to 3. A molar ratio of hydroxyl end groups and carboxylic acid end groups in the unsaturated polyester resin in the range from 1.1 to 3 is preferred as the advantageous effects of the invention are even more pronounced.

The hydroxyl value of the unsaturated polyester resin according to the invention is preferably higher than 25 mg KOH/g resin and more preferably higher than 40 mg KOH/g resin. As used herein, the hydroxyl value of the itaconate containing polyester is determined according to ISO 4629-1996.

Preferably, the molecular weight of the unsaturated polyester comprising itaconate ester units as reactive unsaturations is at least 300 Dalton, preferably at least 500 Dalton and more preferably at least 750 Dalton. Preferably, the molecular weigth $M_n$ of the unsaturated polyester comprising itaconate ester units as reactive unsaturations is at most 10.000 Dalton, more preferably at most 5000 Dalton. The molecular weight ($M_n$) is determined in tetrahydrofurane using GPC according to ISO 13885-1 employing polystyrene standards and appropriate columns designed for the determination of the molecular weights.

In a preferred embodiment of the invention, the molecular weight is in the range from 750 to 5000 Dalton.

The glass transition temperature $T_g$ of the unsaturated polyester is preferably at least −70° C. and at most 100° C. In case the unsaturated polyester is applied for construction purposes, the glass transition temperature $T_g$ of the unsaturated polyester resin present in the resin composition according to the invention is preferably at least −70° C., more preferably at least −50° C. and even more preferably at least −30° C. The $T_g$ of the unsaturated polyester resin present in the resin composition according to the invention is preferably at most 70° C., more preferably at most 50° C. and even more preferably at most 30° C. As used herein, the $T_g$ is determined by means of DSC (heating rate 5° C./min).

The unsaturated polyester according to the invention comprises itaconate ester units as building blocks having the following structural formula.

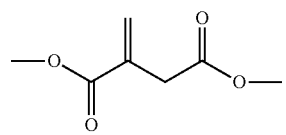

The itaconic ester units (also referred to as itaconic acid building blocks) contains an ethylenic unsaturation that is able to copolymerize with copolymerizable monomer in which the unsaturated polyester may be diluted. The unsaturated polyester according to the invention can be manufactured by polycondensation of at least a polyol and itaconic acid or itaconic acid anhydride as unsaturated dicarboxylic acid. The polycondensation may also be effected in the presence of other dicarboxylic acids containing reactive unsaturations, such as for example maleic acid or anhydride and fumaric acid and/or in the presence of saturated aliphatic dicarboxylic acids or anhydrides, like for example oxalic acid, succinic acid, adipic acid, sebacic acid and/or in the presence of aromatic saturated dicarboxylic acids or anhydrides like for example phthalic acid or anhydride and isophthalic acid. In the polymerisation is further used a di- or polyfunctional alcohol. Preferably, a diol is used, such as for example 1,2-propylene glycol, ethylene glycol, diethylene glycol, triethylene glycol, 1,3-propylene glycol, dipropylene glycol, tripropylene glycol, neopentyl glycol, hydrogenated bisphenol-A. or ethoxylated/propoxylated bisphenol A.

According to a preferred embodiment the molecular weight of the diol in the unsaturated polyester resin is in the range from 60 to 250 Dalton. In a preferred embodiment, the unsaturated polyester resin further comprises isosorbide and/or 1,3-propanediol building blocks, preferably derived from a non fossil source like for example corn.

In the unsaturated polyester resin according to the invention, preferably at least 25 wt. % of the dicarboxylic acid building blocks are itaconic acid building blocks. More preferably, at least 55 wt. % of the dicarboxylic acid building blocks in the unsaturated polyester according to the invention are itaconic acid building blocks.

Preferably at least 25 wt. %, more preferably at least 55 wt. %, of the unsaturated dicarboxylic acid building blocks are itaconic acid building blocks.

In a preferred embodiment, at least part of the itaconic acid or itaconic anhydride is derived from a non-fossil source, for example from corn.

The unsaturated polyester resin according to the invention can be advantageously prepared in the presence of at least one radical inhibitor selected from copper carboxylate, benzoquinone, alkyl substituted benzoquinone, hydroquinone and/or a methyl substituted hydroquinone. In a preferred embodiment, the unsaturated polyester according to the invention is prepared by (i) charging the reactor with itaconic acid and/or itaconic anhydride and optionally other diacids, at least one diol, and at least one radical inhibitor selected from copper carboxylate, benzoquinone, alkyl substituted benzoquinone hydroquinone and/or a methyl substituted hydroquinone,
  (ii) heating the reactor till a temperature of from 180 to 200° C. until the acid value of the formed unsaturated polyester is below 60,
  (iii) cooling the formed resin, preferably to a temperature of from 20 up to 120° C., and
  (iv) optionally diluting the resin with reactive diluent.

Preferably, the unsaturated polyester resin according to the invention is prepared in the presence of hydroquinone, 2-methylhydroquinone, benzoquinone, or 2-methylbenzoquinone as inhibitor, more preferably in the presence of 2-methylhydroquinone as inhibitor and even more preferably, in the presence of hydroquinone and 2-methylhydroquinone as inhibitor.

The unsaturated polyester comprising itaconate ester units as reactive unsaturations is preferably composed of from 33 to 66 mol % glycol monomers, from 10 to 66 mol % itaconic acid monomers, from 0 to 65 mol % unsaturated diacid monomers (other than itaconic acid monomers, like for example fumaric and maleic acid monomers) and from 0 to 65 mol % diacids other than unsaturated diacid monomers, preferably from 0 to 50 mol % diacids other than unsaturated diacid monomers.

In one embodiment, the unsaturated polyester resin according to the invention can be applied as a powder coating resin. The preparation of powder coating compositions is described by Misev in "Powder Coatings, Chemistry and Technology" (pp. 224-300; 1991, John Wiley) hereby incorporated by reference. Therefore the present invention also relates to a powder coating composition comprising an unsaturated polyester according to the invention. In case the unsaturated polyester according to the invention is applied in a powder coating composition, the glass transition temperature $T_g$ of the unsaturated polyester resin is preferably at least 20° C., more preferably at least 25° C. and even more preferably at least 30° C. and at most 100° C., more preferably at most 80° C. and even more preferably at most 60° C.

A common way to prepare a powder coating composition is to mix the separately weight-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a powder coating composition of the right particle size. Therefore, the invention also relates to a process for the preparation of a powder coating composition according to the invention comprising the steps of:
  a. mixing the components of the powder coating composition comprising the unsaturated polyester according to the invention to obtain a premix
  b. heating the obtained premix, preferably in an extruder, to obtain an extrudate
  c. cooling down the obtained extrudate to obtain a solidified extrudate and
  d. breaking the obtained solidified extrudate into smaller particles to obtain the powder coating composition
and preferably comprising the further step of classifying the thus prepared powder particles via a sieve and collect sieve fraction with particle size below 90 μm.

The powder coating composition of the present invention may optionally contain the usual additives, such as for example fillers/pigments, degassing agents, flow agents, or (light) stabilizers. Examples of flow agents include Byk 361 N. Examples of suitable fillers/pigments include metal oxides, silicates, carbonates or sulphates. Examples of suitable stabilizers include UV stabilizers, such as for example phosphonites, thioethers or HALS (hindered amine light stabilizers). Examples of degassing agents include benzoin and cyclohexane dimethanol bisbenzoate. Other additives, such as additives for improving tribo-chargeability may also be added.

In another aspect, the invention relates to a process for coating a substrate comprising the following steps:
  1) applying a powder coating composition according to the invention to a substrate such that the substrate is partially or fully coated with a coating.
  2) heating the obtained partially or fully coated substrate for such time and to such temperature such that the coating is at least partially cured.

The powder coating composition of the present invention may be applied using the techniques known to the person skilled in the art, for example using electrostatic spray or electrostatic fluidized bed.

The present invention further relates to a resin composition comprising the unsaturated polyester according to the invention and further comprising reactive diluent.

The amount of such reactive diluent in the resin composition according to the invention is usually in the range from 5 to 75 wt. %, preferably in the range from 20 to 60 wt. %, most preferably in the range from 30 to 50 wt. % (relative to the total amount of unsaturated polyester and reactive diluent present in the resin composition). The diluent will be applied, for instance, for lowering of the viscosity of the resin composition in order to make handling thereof more easy. For clarity purpose, a reactive diluent is a diluent that is able to copolymerize with the unsaturated polyester resin. Ethylenically unsaturated compounds can be advantageously used as reactive diluent. Preferably, styrene, dimethyl itaconate and/or a methacrylate containing compound is used as reactive diluent. In one embodiment of the invention, styrene, α-methylstyrene, 4-methylstyrene, (meth)acrylate containing compounds, N-vinylpyrrolidone and/or N-vinylcaprolactam is used as reactive diluent. In this embodiment, styrene and/or (meth)acrylate containing compound is preferably used as reactive diluent and more preferably (meth)acrylate containing compound is used as reactive diluent. In another embodiment, itaconic acid or an ester of itaconic acid is used as reactive diluent. In a more preferred embodiment, the reactive diluent comprises an ester of itaconic acid and at least another ethylenically unsaturated compound, such as for example styrene, α-methylstyrene, 4-methylstyrene (meth)acrylates, N-vinylpyrrolidone and/or N-vinylcaprolactam. In this embodiment, the resin composition preferably comprises an ester of itaconic acid as reactive diluent and styrene as reactive diluent or a methacrylate containing compound as reactive diluent. A preferred ester of itaconic acid is dimethyl itaconate.

The resin composition preferably further comprises a co-initiator for the radical curing of the resin composition, in an amount of from 0.00001 to 10 wt % (relative to the total amount of unsaturated polyester and reactive diluent present in the resin composition). A preferred co-initiator is an amine or a transition metal compound.

The amine co-initiator that may be present in the composition is preferably an aromatic amine and even more preferably a tertiary aromatic amine. Suitable accelerators include N,N-dimethylaniline, N,N-diethylaniline; toluidines and xylidines such as N,N-diisopropanol-para-toluidine; N,N-dimethyl-p-toluidine; N,N-bis(2-hydroxyethyl)xylidine and -toluidine. The amount of amine in the resin composition (relative to the total amount of unsaturated polyester and reactive diluent present in the resin composition) is generally at least 0.00001 wt. % and preferably at least 0.01 wt. % and more preferably at least 0.1 wt. %. Generally, the amount of amine in the resin composition is at most 10 wt. %, preferably at most 5 wt. %.

Examples of suitable transition metal compounds as co-initiator are compounds of a transition metal with an atomic number of in the range from 22 to 29 or with an atomic number in the range from 38 to 49 or with an atomic number in the range from 57 to 79, such as vanadium, iron, manganese, copper, nickel, molybdenum, tungsten, cobalt, chromium compounds. Preferred transition metals are V, Cu, Co, Mn and Fe.

After having diluted the unsaturated polyester according to the invention with reactive diluent, additional radical inhibitors may be added. These radical inhibitors are preferably chosen from the group of phenolic compounds, benzoquinones, hydroquinones, catechols, stable radicals and/or phenothiazines. The amount of radical inhibitor that can be added may vary within rather wide ranges, and may be chosen as a first indication of the gel time as is desired to be achieved.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), galvinoxyl, aluminium-N-nitrosophenyl hydroxylamine, diethylhydroxylamine, phenothiazine and/or derivatives or combinations of any of these compounds.

Advantageously, the amount of radical inhibitor in the resin composition according to the invention (relative to the total amount of unsaturated polyester and reactive diluent present in the resin composition). is in the range of from 0.0001 to 10% by weight. More preferably, the amount of inhibitor in the resin composition is in the range of from 0.001 to 1% by weight. The skilled man quite easily can assess, in dependence of the type of inhibitor selected, which amount thereof leads to good results according to the invention.

The present invention further relates to a process for radically curing the resin composition according to the invention, wherein the curing is effected by adding an initiator to the resin composition as described above. Preferably, the curing is effected at a temperature in the range of from −20 to +200° C., preferably in the range of from −20 to +100° C., and most preferably in the range of from −10 to +60° C. (so-called cold curing). The initiator is a photoinitiator, a thermal initiator and/or redox initiator.

As meant herein, a photo initiator is capable of initiating curing upon irradiation Photo initiation is understood to be curing using irradiation with light of a suitable wavelength (photo irradiation). This is also referred to as light cure.

A photo-initiating system may consist of a photo initiator as such, or may be a combination of a photo initiator and a sensitizer, or may be a mixture of photo initiators, optionally in combination with one or more sensitizers.

The photo initiating system that can be used in the context of the present invention can be chosen from the large group of photo-initiating systems known to the skilled person. A vast number of suitable photo initiating systems, can be found in, for instance, Volume 3 of "Chemistry and Technology of UV and EB Formulations", $2^{nd}$ Edition, by K. Dietliker and J. V. Crivello (SITA Technology, London; 1998).

The thermal initiator can be selected from azo compounds like for example azo isobutyronitril (AIBN), C—C labile compounds like for example benzopinacole, peroxides, and mixtures thereof. The thermal initiator is preferably an organic peroxide, or a combination of two or more organic peroxides.

The redox initiator is preferably an organic peroxide in combination with at least one of the above mentioned co-initiators. Examples of suitable peroxides are, for instance, hydroperoxides, peroxy carbonates (of the formula —OC(O)

OO—), peroxyesters (of the formula —C(O)OO—), diacylperoxides (of the formula —C(O)OOC(O)—), dialkylperoxides (of the formula —OO—), etc.

The present invention further also relates to cured objects or structural parts prepared from unsaturated polyester resin compositions as described above, by curing with an initiator as described above. As used herein, structural resin compositions are capable of providing structural parts which are suitable to be applied for construction purposes. Generally such resin compositions are non-aqueous systems. They contain at most 5% by weight of water, mainly resulting from the reactions during resin preparation. As meant herein, structural parts are considered to have a thickness of at least 0.5 mm and appropriate mechanical properties after curing. End segments where the resin compositions according to the present invention can be applied are for example automotive parts, boats, chemical anchoring, roofing, construction, containers, relining, pipes, tanks, flooring, windmill blades.

The present invention in particular relates to cured objects or structural parts obtained by curing of a resin composition according to the invention with an initiator, preferably comprising a peroxide. According to one embodiment, the curing is preferably effected by moulding, more preferably the curing is effected by compression moulding to obtain in particular a SMC or BMC part. The moulding is preferably effected at a temperature of at least 130° C., more preferably at least 140° C.; and at a temperature of at most 170° C., more preferably of at most 160° C.

The invention is now demonstrated by means of a series of examples and comparative examples. All examples are supportive of the scope of claims. The invention, however, is not restricted to the specific embodiments as shown in the examples.

Standard Resin Synthesis

The diols, diacids and/or anhydrides, optionally inhibitor and catalyst were charged in a vessel equipped with a packed column, a temperature measurement device and inert gas inlet. The mixture was heated slowly by usual methods to 200° C. The mixture was kept at 200° C. until the distillation of water stopped. The packed column was removed and the mixture was kept under reduced pressure until the acid value reached a certain value. Then the vacuum was relieved with inert gas, and the mixture was cooled down to 130° C. or lower. The solid UP resins were obtained in this way. Next the solid resin was dissolved in a reactive diluent at temperatures below 80° C.

Monitoring of Curing

Curing was monitored by means of standard gel time equipment. This is intended to mean that both the gel time ($T_{gel}$ or $T_{25\rightarrow 35°\ C.}$) and peak time ($T_{peak}$ or $T_{25\rightarrow peak}$) were determined by exotherm measurements according to the method of DIN 16945 when curing the resin with the peroxide as indicated.

Mechanical Property Determination

For the determination of mechanical properties 4 mm castings were prepared. After 16 hrs the castings were released from the mould and postcured using 24 hr at 60° C. followed by 24 hr at 80° C.

Mechanical properties of the cured objects were determined according to ISO 527-2. The Heat Distortion Temperature (HDT) was measured according to ISO 75-A.

The viscosity of the dissolved resin was determined at 23° C. using a physica instrument.

Barcoll hardness was determined according to DIN EN59.

EXAMPLES 1-2 AND COMPARATIVE EXPERIMENTS A-C

Resins were prepared via the standard synthesis procedure using 732 g itaconic acid, 471 g 1,2-propylene glycol and 100 ppm 2-methyl hydroquinone. The synthesis of the resin was continued until the acid values listed in table 1 were reached. If applicable the resins were cured after dilution (with 35 wt. % styrene) using 0.5 wt % of a cobalt solution (NL-49P) followed by 2 wt % Trigonox 44B as peroxide.

TABLE 1

|  | Comp A | Comp B | Ex 1 | Ex 2 | Comp C |
|---|---|---|---|---|---|
| Acid value of the neat resin (mg KOH/g resin) | 10 | 20 | 41 | 55 | 150 |
| Hydroxyl value of the neat resin (mg KOH/g resin) |  | 50 | 103 | 117 | 210 |
| Molar ratio of hydroxyl end groups and carboxylic acid end groups |  | 2.5 | 2.51 | 2.13 | 1.4 |
| Viscosity @23° C. (mPa · s) | gel | gel | 1248 | 883 | 341 |
| Tensile strength (MPa) |  |  | 71 | 70 | (a) |
| Tensile modulus (GPa) |  |  | 3.5 | 3.6 | (a) |
| Elongation at break (%) |  |  | 2.8 | 2.3 | (a) |
| Flexural strength (MPa) |  |  | 112 | 120 | (a) |
| Flexural modulus (GPa) |  |  | 3.4 | 3.2 | (a) |
| Barcol Hardness |  |  | 45 | 48 | 0 |
| HDT (° C.) |  |  | 97 | 96 | (b) |

These examples clearly demonstrate that only by using itaconate resins with an acid value in the range from 25 to 125 mg KOH/g resin castings with mechanical properties suitable for construction purposes can be obtained.

(a) Casting too soft to be useful as indicated by a barcoll hardness of 0.

(b) Casting was already flexible at room temperature indicating a HDT<25° C.

COMPARATIVE EXPERIMENTS D AND E

Example 1 was repeated except for the amounts of itaconic acid and 1,2-propylene glycol, resulting in a resin with an acid value and hydroxyl value as indicated in Table 2.

TABLE 2

|  | Comp D | Comp E |
|---|---|---|
| Itaconic acid (g) | 732 | 732 |
| 1,2-propylene glycol | 213 | 851 |
| Acid value of the neat resin (mg KOH/g resin) | 465 | 40 |
| Hydroxyl value of the neat resin (mg KOH/g resin) | 101 | 500 |
| Molar ratio of hydroxyl end groups and carboxylic acid end groups | 0.22 | 12.5 |
| Mechanical properties | a | b | a: resin is too brittle to be able to determine mechanical properties of the casting.
b: resin is too soft and does not have sufficient mechanical integrity, such that it was impossible to determine mechanical properties of the casting.

COMPARATIVE EXPERIMENTS F-H

The resin synthesis as described in examples 1, 2 and 3 of WO-A-9727253 was repeated resulting in unsaturated polyesters comprising itaconate esters as reactive unsaturations with the following acid value (mg KOH/g resin), hydroxyl value (mg KOH/g resin) and molar ratio of hydroxyl end groups and carboxylic acid end groups:

Resin example 1 of WO-A-9727253 (comparative experiment F): acid value=7.6; hydroxyl value=61; molar ratio=8.03

Resin example 2 of WO-A-9727253 (comparative experiment G): acid value=42; hydroxyl value=0; molar ratio=0

Resin example 3 of WO-A-9727253 (comparative experiment H): acid value=73; hydroxyl value=0; molar ratio=0

The obtained resins were diluted in styrene and cured after dilution (with 35 wt. % styrene) using 0.5% of a cobalt solution (NL-49P) followed by 2% Trigonox 44B as peroxide, and castings were made. The castings were extremely brittle. The casting as obtained in Comp Ex F and H (both containing 35 wt. % styrene) were so brittle that mechanical properties could not be determined. The resin of example 2 of WO-A-9727253 (comparative experiment G) has to be diluted further to 52 wt. % styrene in order to obtain a viscosity which allows to make a casting. This casting was too brittle to be able to measure tensile properties and the flexural strength was only 30 MPa.

These comparative experiments clearly demonstrate that unsaturated polyesters known in the literature comprising itaconate esters as reactive unsaturations and either an acid value and/or molar ratio outside the claimed range did not result in resin compositions which can be used for construction purposes.

EXAMPLE 3 AND 4

Resins were prepared via the standard synthesis procedure with the listed ingredients in table 3. The resins were cured using 0.5 wt. % of a cobalt solution (NL-49P) followed by 2 wt. % Trigonox 44B as peroxide. The curing was monitored with the gel time equipment.

TABLE 3

|  | Example 3 | Example 4 |
| --- | --- | --- |
| Itaconic acid (g) | 429.3 | 429.3 |
| Phtalic anhydride (g) | 992.4 | 992.4 |
| 1,2-propylene glycol (g) | 718.0 | 844.5 |
| Isosorbide (g) |  | 243.2 |
| Acid value neat resin (mg KOH/g resin) | 44 | 43 |
| Hydroxyl value of the neat resin (mg KOH/g resin) | 101 | 104 |
| Molar ratio of hydroxyl end groups and carboxylic acid end groups | 2.3 | 2.42 |
| Reactive diluent | Styrene | Styrene |
| Solid content | 65% | 65% |
| Viscosity @23° C. (mPa·s) | 613 | 450 |
| Gel time (min) | 25 | 17 |
| Peak time (min) | 41 | 64 |
| Peak temperature (° C.) | 130 | 73 |
| Tensile strength (MPa) | 75 | 60 |
| Tensile modulus (GPa) | 4.2 | 3.2 |
| Elongation at break (%) | 1.9 | 2.3 |
| Flexural strength (MPa) | 111 | 90 |
| Flexural modulus (GPa) | 4.3 | 2.8 |
| Barcol Hardness | 42 | 38 |
| HDT (° C.) | 70 | 45 |

These examples clearly show that besides itaconate esters also other diacids or anhydrides can be applied in order to obtain mechanical properties suitable for construction purposes. Furthermore these examples also show that mixtures of diols can be applied according to the invention.

EXAMPLE 5-8

Resins were prepared via the standard synthesis procedure with the listed ingredients in table 4. The resins were cured using 0.5 wt. % of a cobalt solution (NL-49P) followed by 1.5 wt. % Trigonox 44B as peroxide. The curing was monitored with the gel time equipment.

TABLE 4

|  | Example 5 | Example 6 | Example 7 | Example 8 |
| --- | --- | --- | --- | --- |
| Itaconic acid | 582 | 593 | 567 | 484 |
| Maleic anhydride |  |  |  | 101 |
| 1,2-propylene glycol | 317 | 342 | 282 | 330 |
| Isosorbide | 101 | 65 | 151 | 85 |
| Acid value neat resin (mgKOH/g resin) | 45 | 43 | 49 | 56 |
| Hydroxyl value of the neat resin (mg KOH/g resin) | 94 | 94 | 99 | 78 |
| Molar ratio of hydroxyl end groups and carboxylic acid end groups | 2.1 | 2.2 | 2.02 | 1.4 |
| Reactive diluent | styrene | Styrene | styrene | Styrene |
| Solid content (%) | 63 | 64 | 65 | 64 |
| Viscosity @23° C. (mPa·s) | 1140 | 1250 | 1140 | 1475 |
| Gel time (min) | 19 | 28 | 34 | 14 |
| Peak time (min) | 29 | 37 | 43 | 20 |
| Temperature (° C.) | 146 | 157 | 133 | 161 |
| Tensile strength (MPa) | 77 | 72 | 57 | 70 |
| Tensile modulus (GPa) | 3.5 | 3.5 | 3.7 | 3.5 |
| Elongation at break (%) | 3.1 | 2.9 | 1.7 | 2.3 |
| Flexural strength (MPa) | 124 | 121 | 109 | 86 |
| Flexural modulus (GPa) | 3.5 | 3.5 | 3.7 | 3.6 |
| Barcol Hardness | 45 | 45 | 43 | 52 |
| HDT (° C.) | 98 | 95 | 91 | 104 |

These examples demonstrate that besides itaconate also another unsaturated diacid or anhydride can be applied according to the invention. Furthermore these examples demonstrate that besides itaconic acid as possible biobased renewable building block also isosorbide as biobased renewable building block can be applied.

EXAMPLE 9

Resins were prepared via the standard synthesis procedure with the listed ingredients in table 5. The resins were cured using 0.5 wt % of a cobalt solution (NL-49P) followed by 2 wt % Trigonox 44B as peroxide. The curing was monitored with the gel time equipment.

TABLE 5

|  | Example 9 |
| --- | --- |
| Itaconic acid (g) | 732 |
| 1,3-propanediol (g) | 471 |
| 2-methyl hydroquinone | 500 ppm |
| Acid value neat resin (mgKOH/g resin) | 44 |
| Hydroxyl value of the neat resin (mg KOH/g resin) | 106 |
| Molar ratio of hydroxyl end groups and carboxylic acid end groups | 2.41 |
| Reactive diluent | Styrene |
| Solid content (%) | 65 |
| Viscosity @23° C. (mPa·s) | 669 |
| Gel time (min) | 320 |
| Peak time (min) | 334 |
| Temperature (° C.) | 143 |
| Tensile strength (MPa) | 63 |
| Tensile modulus (GPa) | 2.9 |
| Elongation at break (%) | 3.1 |
| Flexural strength (MPa) | 90 |
| Flexural modulus (GPa) | 2.8 |
| HDT (° C.) | 105 |
| Barcol hardness | 43 |

This example demonstrate that besides itaconic acid as possible biobased renewable building block also 1,3-propane diol as biobased renewable building block can be applied. In fact this example elegantly demonstrates that it is possible to employ 100% biobased resins as resins for construction purposes.

The invention claimed is:

1. An unsaturated polyester resin comprising itaconate esters as reactive unsaturations, wherein the acid value of the resin is in the range of from 35 to 75 mg KOH/g resin and the molar ratio of hydroxyl end groups and carboxylic acid end groups in the unsaturated polyester resin is in the range of from 1.1 to 3, and wherein at least 25 wt. % of the unsaturated dicarboxylic acid building blocks of the unsaturated polyester resin are itaconic acid building blocks.

2. The unsaturated polyester resin according to claim 1, wherein the OH value of the resin is higher than 25 mg KOH/g resin.

3. The unsaturated polyester resin according to claim 2, wherein the OH value of the resin is higher than 40 mg KOH/g resin.

4. The unsaturated polyester resin according to claim 1, wherein the resin has a molecular weight Mn in the range of from 750 to 5000 Dalton.

5. The unsaturated polyester resin according to claim 1, wherein at least 55 wt. % of the unsaturated dicarboxylic acid building blocks of the unsaturated polyester are itaconic acid building blocks.

6. The unsaturated polyester resin according to claim 1, wherein the unsaturated polyester resin further comprises isosorbide and/or 1,3-propane diol building blocks.

7. A resin composition comprising the unsaturated polyester resin according to claim 1, and a reactive diluent.

8. A cured object or structural part obtained by curing an unsaturated polyester resin composition according to claim 7 with an initiator.

9. The cured object or structural part according to claim 8, wherein the initiator comprises a peroxide.

10. The cured object or structural part according to claim 9, wherein the cured object or structural part is selected from the group consisting of automotive parts, boats, chemical anchoring parts, roofing parts, construction parts, containers, relining parts, pipes, tanks, flooring and windmill blades.

11. A powder coating composition comprising an unsaturated polyester resin according to claim 1.

* * * * *